United States Patent [19]

Riley

[11] Patent Number: 4,486,400

[45] Date of Patent: Dec. 4, 1984

[54] VANADIUM OXIDE SYNTHESIS

[75] Inventor: Brian Riley, Willimantic, Conn.

[73] Assignee: Combustion Engineering, Inc., Windsor, Conn.

[21] Appl. No.: 498,140

[22] Filed: May 25, 1983

[51] Int. Cl.$^3$ .............................................. C01G 31/02
[52] U.S. Cl. .................................................... 423/592
[58] Field of Search ........................................ 423/592

[56] References Cited

FOREIGN PATENT DOCUMENTS

| 749866 | 1/1967 | Canada | 423/592 |
| 49-47294 | 5/1974 | Japan | 423/592 |
| 327795 | 9/1975 | U.S.S.R. | 423/592 |

OTHER PUBLICATIONS

Selim et al., "Thermochimica Acta", vol. 36, 1980, pp. 287–297.
Trau, "J. of Thermal Analysis", vol. 16, 1979, pp. 201–204.
Satava, "Coll. Czechoslov. Chem. Commun.", vol. 24, 1959, pp. 2172–2181.
D. W. Murphy et al., "Lithium Incorporation by $V_6O_{13}$ and Related Vanadium (+4 +5) Oxide Cathode Materials", J. Electrochem. Soc., vol. 128, No. 10, pp. 2053 et seq., (Oct. 1981).
K. Wilhelmi et al., "A Refinment of the Crystal Structure of $V_6O_{13}$", Acta Chem. Scand., vol. 25, No. 7, pp. 2675 et seq., (1971).
D. W. Murphy et al., "Vanadium Oxide Cathode Materials for Secondary Lithium Cells", J. Electrochem. Soc., vol. 126, No. 3, pp. 497 et seq, (Mar. 1979).

Primary Examiner—Herbert T. Carter
Attorney, Agent, or Firm—Brumbaugh, Graves, Donohue & Raymond

[57] ABSTRACT

A process for preparing stoichiometric $V_6O_{13}$ usable as the cathode active material in high energy density primary and secondary batteries comprises the steps of: (a) raising the temperature of ammonium metavanadate up to a temperature of from about 350° C. to about 400° C. over an approximately 2 hour time period in a dynamic atmosphere of nitrogen gas to thermally decompose the ammonium metavanadate into a nonstoichiometric $V_6O_{13}$ product while evolving successively ammonia, water vapor and oxygen; (b) holding the nonstoichiometric $V_6O_{13}$ product at said temperature of from about 350° C. to about 400° C. for about 4 hours in said dynamic atmosphere of nitrogen gas; (c) heating the nonstoichiometric $V_6O_{13}$ product at a temperature of from about 400° C. to about 500° C. for from about 8 hours to about 12 hours in a dynamic atmosphere of a gaseous mixture having a composition giving an oxygen partial pressure equal to the oxygen partial pressure over stoichiometric $V_6O_{13}$ at said temperature to form stoichiometric $V_6O_{13}$; and (d) cooling the stoichiometric $V_6O_{13}$ to room temperature in said dynamic atmosphere of said gaseous mixture.

7 Claims, No Drawings

VANADIUM OXIDE SYNTHESIS

The present invention relates to a process for preparing stoichiometric $V_6O_{13}$ usable as the cathode active material in high energy density primary and secondary batteries.

A large number of different phases have been reported in the literature for the vanadium-oxygen system ranging from VO to $VO_{2.5}$. $V_6O_{13}$ is the "K" phase and has a monoclinic structure. Its lattice parameters are $a=11.90$; $b=3.671$; $c=10.122$; and $\beta=100.87°$.

It has previously been reported that cells containing cathodes made from $V_6O_{13\pm x}$, where $x=\sim 0.05$, exhibit discharges to low voltages with little or no degradation of performance. The best results, however, are for those cells using stoichiometric $V_6O_{13.00}$ material.

$V_6O_{13}$ (and many other similar oxide type materials) have previously been synthesized by reaction of vanadium metal powder with $V_2O_5$ or by solid state interdiffusion at elevated temperatures of $V_2O_5$ and $V_2O_3$ or by the thermal decomposition of ammonium metavandate in an inert atmosphere.

The three types of $V_6O_{13}$ synthesis described above are either a closed system of the oxide and vanadium metal whose average, or mean oxygen-to-vanadium metal ratio is equal to that of the specific oxide required, or by varying the dynamic inert gas flow rate over the decomposing ammonium metavanadate, the oxide required is produced.

In the first two cases, extended annealing at high temperatures is required leading to low surface area and poor economies. The third, and most commonly reported process is virtually trying to "hit a point" on a time-temperature-gas flow curve. Also inherent in this system will be the furnace geometry and furnace load, and as such, it will be difficult, if not impossible, to transfer established reaction conditions for one system to another.

This is not so if the process for synthesizing an oxide with a precise or specific stoichiometry by oxygen partial pressure equilibrating, which is an intrinsic property of the system at a specific temperature, i.e., the oxygen equilibrium partial pressure over $V_6O_{13}$ at, say, 400° C. is exactly the same for 1 gram as for 1 kilogram or conversely, a furnace 6 in. long by 1 in. diameter is the same as for a furnace 6 ft. long by 1 ft. diameter.

The above premise is the basis for the present invention, to first establish the equilibrium oxygen partial pressure over the single-phase compound $V_6O_{13}$ at two or three temperatures and then plot these on a $\Delta F_o = RT \ln P_{O_2}$ verus temperature Ellingham diagram. Also superimposed onto the Ellingham diagram would be the oxygen partial pressures $P_{O_2}$ atmosphere, and the corresponding gas mixtures $P_{H_2}/P_{H_2O}$ and $P_{CO}/P_{CO_2}$.

It is possible to establish, therefore, the oxygen partial pressure over, say, $V_6O_{13}$ at 400° C. and 500° C. by equilibriating the oxide at these temperatures in various $CO/CO_2$ or $H_2/H_2O$ gas mixtures until the oxide so formed corresponds to the stoichiometric $V_6O_{13}$ when analyzed.

The process of the present invention for preparing stoichiometric $V_6O_{13}$, therefore, comprises the steps of:

(a) raising the temperaure of ammonium metavanadate up to a temperature of from about 350° C. to about 400° C. over an approximately 2 hour time period in a dynamic atmosphere of nitrogen gas to thermally decompose the ammonium metavanadate into a nonstoichiometric $V_6O_{13}$ product while evolving successively ammonia, water vapor and oxygen;

(b) holding the nonstoichiometric $V_6O_{13}$ product at said temperature of from about 350° C. to about 400° C. for about 4 hours in said dynamic atmosphere of nitrogen gas;

(c) heating the nonstoichiometric $V_6O_{13}$ product at a temperature of from about 400° C. to about 500° C. for from about 8 hours to about 12 hours in a dynamic atmosphere of a gaseous mixture having a composition giving an oxygen partial pressure equal to the oxygen partial pressure over stoichiometric $V_6O_{13}$ at said temperature to form stoichiometric $V_6O_{13}$; and (d) cooling the stoichiometric $V_6O_{13}$ to room temperature in said dynamic atmosphere of said gaseous mixture.

The process can be conducted in a vertical tube furnace, horizontal furnace or moving zone furnace. As a preliminary step, the ammonium metavanadate is purged with a stream of nitrogen gas.

In raising the temperature of the ammonium metavanadate up to about 350° C.-400° C. in the presence of a stream of nitrogen gas, it thermally decomposes in accordance with the following theoretical equation:

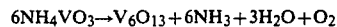

$$6NH_4VO_3 \rightarrow V_6O_{13} + 6NH_3 + 3H_2O + O_2$$

The ammonia ($\sim 14$ wt. %) is evolved at a temperature of about 200° C.-260° C.; the water vapor ($\sim 8$ wt. %) evolves at a temperature of about 300° C.-350° C.; and the oxygen ($\sim 4$ wt. %) evolves at a temperature of about 350° C.-400° C.

Ammonia disassociates or "cracks" at high temperature into nitrogen and hydrogen in accordance with the following equation:

$$2NH_3 \rightleftharpoons N_2 + 3H_2$$

The presence of hydrogen in the synthesis of $V_6O_{13}$ would be deleterious since it would reduce the $V_6O_{13}$ to lower oxides. However, by carrying out the thermal decomposition of ammonium metavanadate in a dynamic or moving nitrogen gas stream or atmosphere, the above chemical disassociation reaction is forced to the left, i.e., hydrogen and nitrogen recombine to form ammonia. The deleterious side effect of hydrogen is thus suppressed.

The gaseous mixture used in step (c) for stoichiometric adjustment or tuning can be, for example, a carbon monoxide/carbon dioxide mixture or a hydrogen/water vapor mixture. Such gaseous mixtures at the operating temperature range of about 400° C.-500° C. and their oxygen partial pressures are shown in Table I below.

TABLE I

| Temperature (°C.) | Volume Percent | | | | Oxyen Partial Pressure (atm) |
|---|---|---|---|---|---|
| | CO | $CO_2$ | $H_2$ | $H_2O$ | |
| 400 | 2.0 | 98.0 | 10.0 | 90.0 | $10^{-32}$ |
| 425 | 1.2 | 98.8 | 5.5 | 94.5 | $10^{-30}$ |
| 450 | 0.65 | 99.35 | 3.5 | 96.5 | $10^{-28}$ |
| 475 | 0.4 | 99.6 | 2.0 | 98.0 | $10^{-27.5}$ |
| 500 | 0.2 | 99.8 | 1.0 | 99.0 | $10^{-25}$ |

The stoichiometric $V_6O_{13}$ product of the process of the present invention has a small average partial size of the order of about 2 microns and a large surface area of the order of about 17 $m^2/g$.

The process of the present invention will be illustrated by the following representative example thereof.

EXAMPLE

A fluid bed of ammonium metavanadate powder in a vertical bed reaction column inside a tube furnace was purged with a stream of nitrogen gas at a flow rate to give approximately 1 furnace charges per minute. The temperature of the fluid bed, which was monitored by a thermocouple embedded therein, was raised up to a temperature of 350° C.–400° C. over an approximately 2 hour period while continuing the flow of nitrogen gas and avoiding pressurization. The fluid bed temperature was held at 350° C.–400° C. for 4 hours while continuing the flow of nitrogen gas. The fluid bed temperature was then adjusted to 400° C. and the nitrogen gas stream was replaced by a stream of a gaseous mixture composed of 2% by volume carbon monoxide and 98% by volume of carbon dioxide and the fluid bed temperature held at 400° C. for about 8–12 hours. The power to the furnace was thereafter switched off and the fluid bed contents allowed to cool slowly to room temperature while continuing the flow of the carbon monoxide/carbon dioxide gaseous stream. (Quenching the powder while the $CO/CO_2$ gas is still purging the reaction column will still produce good results.)

Analyses of the powdered product by SEM (scanning electron microscope), TGA (thermogravimetric analysis) and X-ray diffraction pattern indicated it to be stoichiometric $V_6O_{13}$. The powdered product had a small average particle size of about 2 microns and a high surface area of approximately 17.3 $m^2/g$.

The process of the present invention has the advantages of using readily available commercial gas mixtures; the nitrogen and carbon monoxide/carbon dioxide mixture are non-corrosive gases and are non-flammable; commercially available furnaces can be used; and the gases used and produced in the thermal decomposition reaction are easily treatable gases and should not pose any threat to the enviroment.

What is claimed is:

1. A process for preparing stoichiometric $V_6O_{13}$ which comprises the steps of:
    (a) raising the temperature of ammonium metavanadate up to a temperature of from about 350° C. to about 400° C. over an approximately 2 hour time period in a dynamic atmosphere of nitrogen gas to thermally decompose the ammonium metavanadate into a nonstoichiometric $V_6O_{13}$ product while evolving successively ammonia, water vapor and oxygen;
    (b) holding the nonstoichiometric $V_6O_{13}$ product at said temperature of from about 350° C. to about 400° C. for about 4 hours in said dynamic atmosphere of nitrogen gas;
    (c) heating the nonstoichiometric $V_6O_{13}$ product at a temperature of from about 400° C. to about 500° C. for from about 8 hours to about 12 hours in a dynamic atmosphere of a gaseous mixture having a composition giving an oxygen partial pressure equal to the oxygen partial pressure over stoichiometric $V_6O_{13}$ at said temperature to form stoichiometric $V_6O_{13}$, said gaseous mixture being composed of from about 2% to about 0.2% by volume of carbon monoxide and from about 98% to about 99.8% by volume of carbon dioxide or composed of from about 10% to about 1% by volume of hydrogen and from about 90% to about 99% by volume of water vapor; and
    (d) cooling the stoichiometric $V_6O_{13}$ to room temperature in said dynamic atmosphere of said gaseous mixture.

2. A process according to claim 1, wherein the nonstoichiometric $V_6O_{13}$ product is heated in step (c) at a temperature of about 400° C. and said gaseous mixture is composed of about 2% by volume of carbon monoxide and about 98% by volume of carbon dioxide.

3. A process according to claim 1, wherein the nonstoichiometric $V_6O_{13}$ product is heated in step (c) at a temperature of about 450° C. and said gaseous mixture is composed of about 0.65% by volume of carbon monoxide and about 99.35% by volume of carbon dioxide.

4. A process according to claim 1, wherein the nonstoichiometric $V_6O_{13}$ product is heated in step (c) at a temperature of about 500° C. and said gaseous mixture is composed of about 0.2% by volume of carbon monoxide and about 99.8% by volume of carbon dioxide.

5. A process according to claim 1, wherein the nonstoichiometric $V_6O_{13}$ product is heated in step (c) at a temperature of about 400° C. and said gaseous mixture is composed of about 10% by volume of hydrogen and about 90% by volume of water vapor.

6. A process according to claim 1, wherein the nonstoichiometric $V_6O_{13}$ product is heated in step (c) at a temperature of about 450° C. and said gaseous mixture is composed of about 3.5% by volume of hydrogen and about 96.5% by volume of water vapor.

7. A process according to claim 1, wherein the nonstoichiometric $V_6O_{13}$ product is heated in step (c) at a temperature of about 500° C. and said gaseous mixture is composed of about 1% by volume of hydrogen and about 99% by volume of water vapor.

* * * * *